United States Patent Office 3,425,055
Patented Jan. 28, 1969

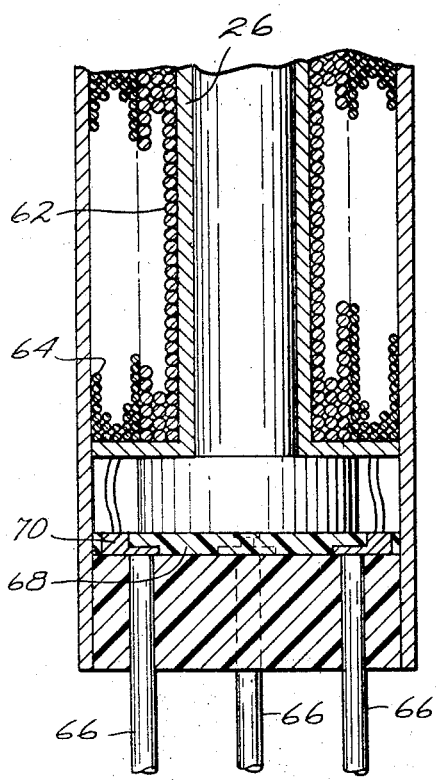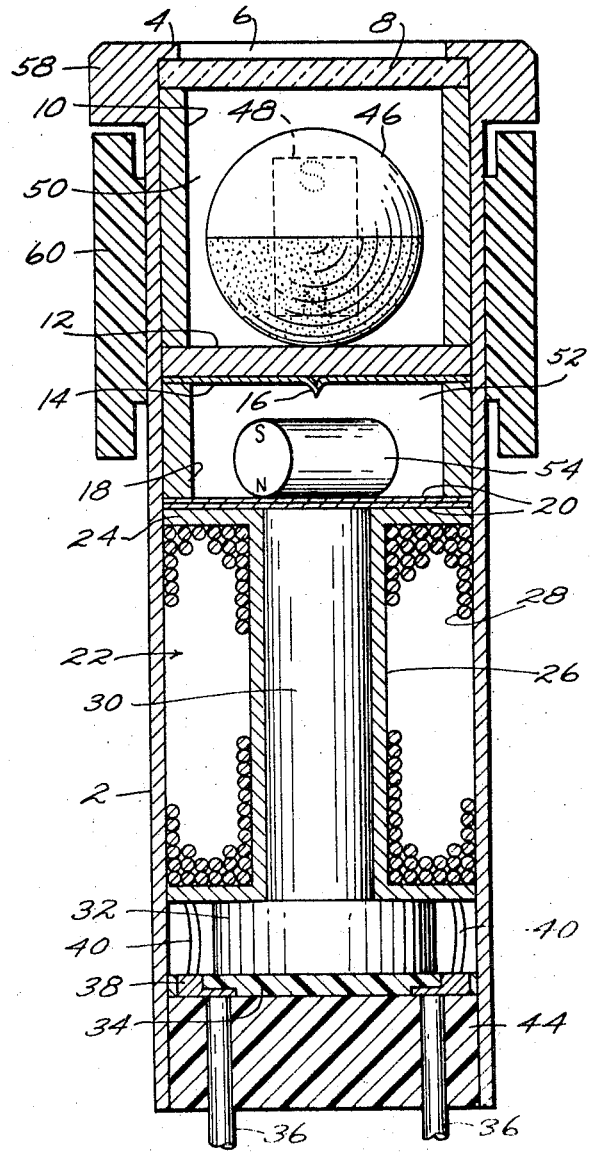
FIG. 2
FIG. 1

3,425,055
PLURAL MAGNET LATCHING ELECTRO-MAGNETIC INDICATORS
George E. Pihl, Abington, and Richard B. Tilley, Holbrook, Mass., assignors to Miniature Electronic Components Corp., Holbrook, Mass., a corporation of Massachusetts
Filed Nov. 29, 1966, Ser. No. 597,606
U.S. Cl. 340—373
Int. Cl. G08b 5/22
16 Claims

ABSTRACT OF THE DISCLOSURE

The following specification describes a miniature electromagnetic indicator in which the indicator member is a ball having localized magnetic poles. The ball is magnetically latched against movement by a cylindrical magnet that is supported so that it will rotate when subjected to a magnetic field. The position of the ball and hence the indication which is provides is changed by energizing a coil in such a way that its resultant magnetic field will cause the cylindrical magnet to rotate and thereby reverse the relative positions of its magnetic poles. As the cylindrical magnet reverses its position its magnetic field causes the ball to rotate to a new position in which it is again latched magnetically by the cylindrical magnet. The ball is unlatched and restored to its initial position by (1) energizing the coil with a current of opposite polarity or (2) by energizing a second coil wound so that it will produce a field opposite to that produced by the first coil when energized with a current of the same polarity or (3) by using an additional magnet to induce in the core on which the coil is wound a magnetic field opposite to that produced by energizing the coil.

---

This invention relates to binary magnetic indicators and more particularly to improvements in electromagnetic indicators of the type described in the copending application of George E. Pihl, Ser. No. 493,314, filed Oct. 6, 1965, for "Electromagnetic Indicator."

Electromagnetic indicators providing non-illuminated contrasting color displays find utility in a variety of installations, e.g., aircraft, portable electronic equipment, etc., and are preferred over illuminated indicators such as those using glow tubes or bulbs where the ambient light conditions make it difficult to distinguish the display from the surrounding background. Electromagnetic indicators also are preferred for installations that are subject to shock or where changes in ambient temperature are large enough to accelerate deterioration of glow tubes and the like.

The electromagnetic indicators described in said copending application, Ser. No. 493,314 are characterized by automatic magnetic latching of a spherical indicator member that is magnetized so as to have discrete poles or contains a permanent magnet with discrete poles. One of the latching methods described in said aforementioned application, Ser. No. 493,314, involves use of a second magnetized spherical member positioned proximate to the indicator member. The two spherical members mutually latch together magnetically to prevent rotation of the indicator member until such time that an overriding magnetic field is produced by energizing an electromagnet comprising a coil wound about a magnetizeable core. This overriding magnetic field causes the two spherical members to reverse their positions. The two spherical members automatically latch together in their new positions, but can be reset, i.e., made to return to their original positions, by introducing a second overriding magnetic field that is opposite to the first applied field. In one of the embodiments described in said application, Ser. No. 493,314, resetting is accomplished by moving the core into proximity with a strong permanent magnet that is located in line with the electromagnet and induces in the core a magnetic field opposite to the field induced therein by energizing the coil.

The latching achieved by using two magnetized spherical members is satisfactory for most applications. However, the latching has a small degree of instability and in certain installations that are subjected to vibration and high G forces, the two spherical members will occasionally unlatch and the indicator member will turn over and provide a different erroneous indication. We have discovered that this problem is due to the fact that the two magnetized members have the same general shape and, therefore, will respond to the same vibration frequencies. There is a further limitation to the embodiment therein described that employs a separate magnet for resetting. To avoid interference with the energizing coil and to achieve proper latching action, it is necessary that the resetting magnet be isolated from the coil and its core until such time as the indicator is to be reset. Maintaining a relatively large gap between the electromagnet and the resetting magnet provides the required degree of isolation. However, in previous constructions this large gap is achieved at the expense of having a relatively long indicator housing.

One of the primary objects of the present invention is to provide an electromagnetic indicator of the type described above having improved magnetic latching that is stable under varying conditions of shock and vibration.

Another primary object of the invention is to provide an electromagnetic indicator of the type described above having an improved resetting magnet assembly arranged so as not to require an extended indicator housing.

These and other objects of the invention are achieved by replacing the second magnetized ball with a magnetized member that has vibration characteristics different than the indicator ball, i.e., resonates at different frequencies than the indicator ball, and which coacts with the indicator ball, to provide a stable latching action. Resetting of the indicator by an auxiliary magnet is achieved by moveably mounting a resetting magnet outside of the indicator housing and by providing the core of the indicator's electromagnet with an extension that projects out of the housing in the path of movement of the resetting magnet. Means are provided for shielding the resetting magnet and holding it away from the core extension until such time as it is desired to reset the indicator, whereupon the resetting magnet is moved toward the core extension. As the gap between the resetting magnet and the core extension is diminished, the resetting magnet induces in the core a magnetic field that overrides the magnetic latching and causes the indicator ball to rotate back to its original position.

Other objects and many of the attendant advantages of the present invention will become more readily apparent from the following detailed specification when considered together with the accompanying drawings, wherein:

FIG. 1 is a longitudinal sectional view of a preferred embodiment of the invention in one of two display conditions;

FIG. 2 is a fragmentary view similar to FIG. 1 of an alternative embodiment of the invention;

Figure 3:
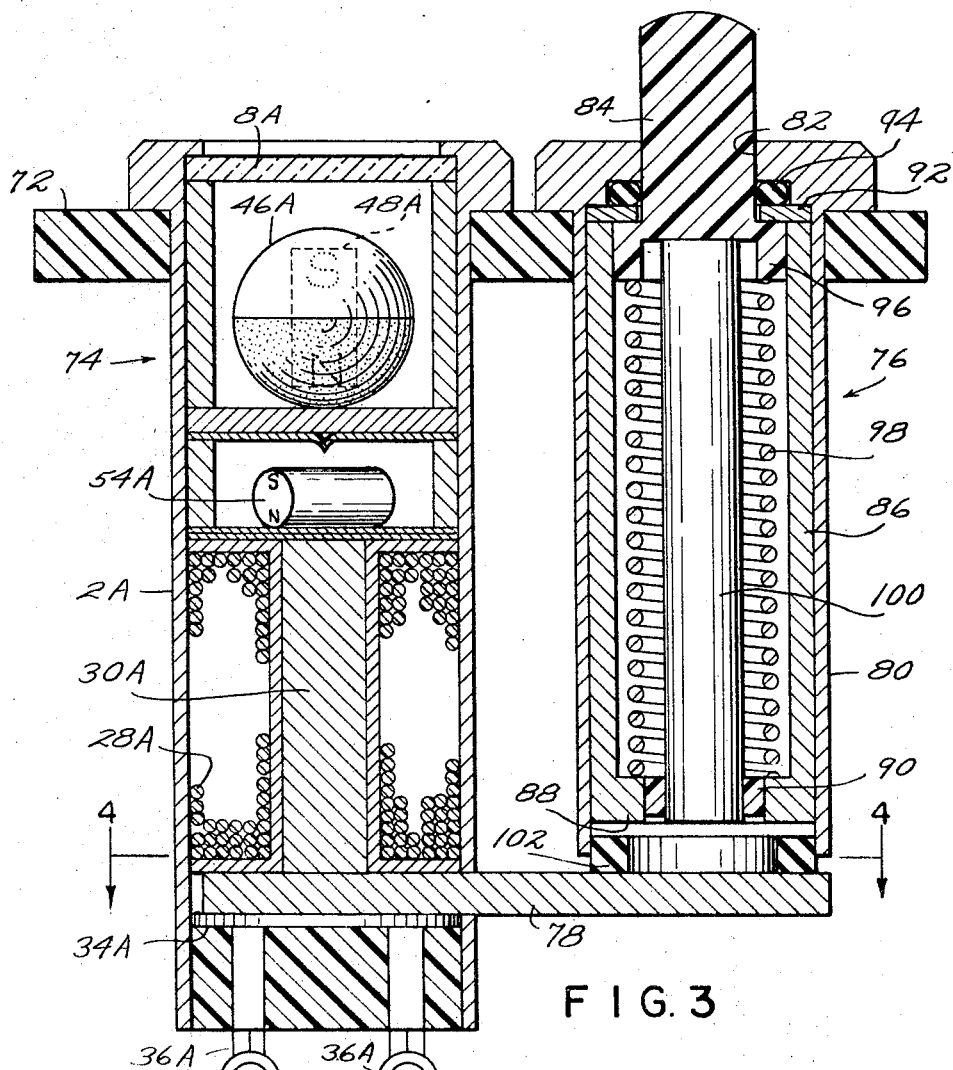
FIG. 3 is a longitudinal, sectional view of a further embodiment of the invention wherein resetting is accomplished by means of an auxiliary magnet located outside of the indicator housing.

Turning now to FIG. 1, the preferred embodiment selected for illustration comprises a cylindrical aluminum case 2 which, as formed, is open at both ends. The front or top end of the case is formed with an inwardly extending flange 4 which defines a display window 6 and acts as a shoulder to support a suitable transparent window pane 8 formed of plastic or glass. Supported within the housing and engaging the transparent pane 8 is a cylindrical plastic sleeve 10. The pane 8 may be cemented to flange 4 or may be held tight against it by the sleeve 10. Preferably the sleeve 10 is formed of a material having a low coefficient of friction. The polyfluoroethylene plastics, e.g., Du Pont's Teflon, are suitable for this purpose. The sleeve 10 is held against pane 8 by a disc 12 which preferably is formed of the same low friction material. Held against the underside of disc 12 is a second disc 14 formed with a conical dimple 16 at its center. Disc 14 preferably is made of beryllium copper but it may be made of some other smooth nonmagnetic sheet material that will not crack when dimple 16 is formed. The two discs 12 and 14 are retained in place by a second plastic sleeve 18 that preferably is formed of the same low friction material as sleeve 10. Sleeve 18 is held in place by two thin Phosphor bronze discs 20 that are captivated between sleeve 18 and an electromagnet unit identified generally by the numeral 22. It is to be understood that discs 20 do not have to be Phosphor bronze but may be made of some other suitable nonmagnetic material.

The electromagnet unit 22 comprises a bobbin or coil form 24 having a hollow stem 26 and carrying a coil of insulated wire 28. Disposed in stem of the bobbin is a magnetizeable core 30. It is preferred that the core be made of a material having some retentivity for memory since this aids latching. Accordingly in the illustrated embodiment core 30 is made of hardened steel. However, it is to be noted that in some cases where a lesser degree of latching is acceptable, the core may be made of a material such as soft iron. The top end of this core contacts the two nonmagnetic discs 20. The bottom end of the core protrudes from bobbin 24 and has a large flange 32 that engages the bobbin's bottom end. The core is held in place by a tabbing board 34 which supports two relatively stiff terminal leads 36. The tabbing board has two conductive segments 38 to which are connected terminal leads 36 and also the ends 40 of the coil 28. Preferably this electromagnet unit is preassembled prior to insertion in the case, with the core 30 being cemented to the bobbin and also to the tabbing board 34. Discs 20 also may be cemented to the bobbin. The electromagnet unit is retained within the housing by a suitable insulating potting compound 44. Additional potting compound may be applied in any open space existing between the bobbin and the tabbing board to lend support to the ends of the coil.

The indicator further includes a ball 46 provided with binary indicia. In the illustrated embodiment the binary indicia consists of two different colors—one half of the surface of ball 46 is one color and the other half is a different color. Typically one hlaf is red or black (represented by stipling in FIG. 1) and the other half is white so as to provide maximum color contrast. Still other binary indicia may be employed such as two printed symbols of different geometric shapes or patterns. Preferably the ball is made of plastic but it could be made of other materials. The ball is formed around a permanent bar magnet 48 having discrete or localized poles. In the illustrated embodiment, the magnet is disposed so that its south pole is in the white half of the ball and its north pole is in the dark side of the ball. As an alternative measure, the ball 46 could be made of a moldable magnetic material magnetized across the diameter to provide localized poles. The ball is confined in a chamber 50 defined by transparent pane 8, sleeve 10 and disc 12. In this connection it is to be noted that sleeve 10 and disc 12 together form a cup and, if desired, these two members could be made as one. The ball is sized so as to fit loosely within chamber 50. Preferably it is just small enough to contact disc 12 and also one point on sleeve 10 without at the same time engaging the pane 8. This allows ample freedom of movement of the ball and minimizes the number of points of frictional contact.

The disc 14, sleeve 18, and the uppermost disc 20 together define a second chamber 52 in which is disposed a permanent magnet 54 of cylindrical shape. This magnet is polarized along its diameter. Its length is substantially less than the inside diameter of sleeve 18 but substantially greater than the distance between disc 14 and the upper disc 20. The diameter of magnet 50 is substantially less than the gap between disc 14 and the upper disc 20. Essentially the magnet is sized so that (a) it can rotate on its axis within chamber 52, (b) it cannot flip over or tumble end to end, and (c) at all times some portion of the magnet will be located directly below the dimple 16.

With the foregoing arrangement, magnet 48 (and thus ball 46) will tend to align itself with magnet 54, with both fields extended in the same direction. Thus, as shown in FIG. 1, if magnet 54 is oriented so that its south pole is up, magnet 48 will be oriented so that its north pole is proximate the south pole of magnet 54. With this orientation of parts, the white side of the ball 46 is displayed in the window of the indicator case. Reversal of the position of ball 46 is effected by pulsing coil 28 with a D.C. signal generated by a D.C. source (not shown) coupled to terminal leads 36. The D.C. pulse has a polarity and magnitude such that the coil will produce a magnetic field opposite to and greater than that of magnet 54. This field is concentrated in core 30 so that its upper end becomes a north pole and its bottom end a south pole. The repelling influence of this field causes magnet 54 to move away from core 30 toward dimple 16. At the same time magnet 54 will tend to undergo rotation to bring its south pole into proximity with the core's north pole. This rotational movement is aided by dimple 16. When magnet 54 moves upward it engages the dimple and, since the dimple rarely contacts it exactly on center, the magnet is deflected sidewise. This deflection promotes rotation of the magnet. As the north pole of magnet 54 rotates toward the ball 46, its field commences to repel magnet 48. The window pane 8 limits movement of magnet 48 and ball 46 away from magnet 54, and the continuing repelling force exerted by magnet 54 causes ball 46 to rotate rapidly to bring its south pole into proximity and alignment with the north pole of magnet 54. The attraction between the north pole of magnet 54 and the south pole of magnet 48 latches the ball so that when the coil is deenergized, the ball will maintain its new position with its dark side exposed in the window. This latching action is also aided by the retained permanent field produced by the core. The dark side of ball 46 will continue to be visible until the coil is reenergized by a new signal with a polarity opposite to that of the previously applied signal. When this occurs, the upper end of core 30 will become a south pole, and magnet 54 will again be repelled by this pole and will rotate to restore it to the position shown in FIG. 1. This reversal of magnet 54 produces a corresponding reversal of ball 46 with latching reoccurring automatically in the manner previously described.

The indicator of FIG. 1 is easily mounted in a panel. In the usual case the indicator case 2 is formed with an exterior flange 58 formed at its top or front end and is equipped with a removable friction sleeve 60. The case is inserted in a hole formed in the mounting panel so that flange 58 engages one side of the panel, and then sleeve 60 is slipped over the case and brought to bear against the rear side of the panel.

Operation of indicators constructed as shown in FIG. 1 is achieved with short duration pulses. In a typical installation the leads 36 are coupled to a D.C. pulse generator through a semiconductor switching circuit that couples a pulse of one polarity to coil 28 when switched to one state and couples a pulse of reverse polarity when switched to a second state, with the switching being determined by changes in a control signal derived from a transducer or sensor such as a thermally controlled switch. In certain cases, it may be desired to use pulses of the same polarity for both modes of operation of the indicator. This is achieved by using an electromagnet comprising two coils instead of one. This modification is shown in FIG. 2 where a first coil 62 is wound directly on stem 26 of the bobbin and a second coil 64 is wound over the coil 62. The ends of these coils are connected to terminal leads 66 by way of tabbing board 68 similar to the tabbing board 34 but differing therefrom in the number of conductive segments 70 for connecting the coils to the terminal leads. The indicator may have three terminal leads 66 with one acting as a common lead or alternatively it may have four leads with two leads connected to one coil and the other two leads connected to the second coil. The coils are wound or connected so that when energized with pulses of the same polarity they will produce equal and opposite magnetic fields. Accordingly, pulsing one coil will drive the ball to one position, e.g., the position shown in FIG. 1 providing a white indication, and pulsing the other coil will cause the ball to reverse its position to provide a second indication.

Figure 4:
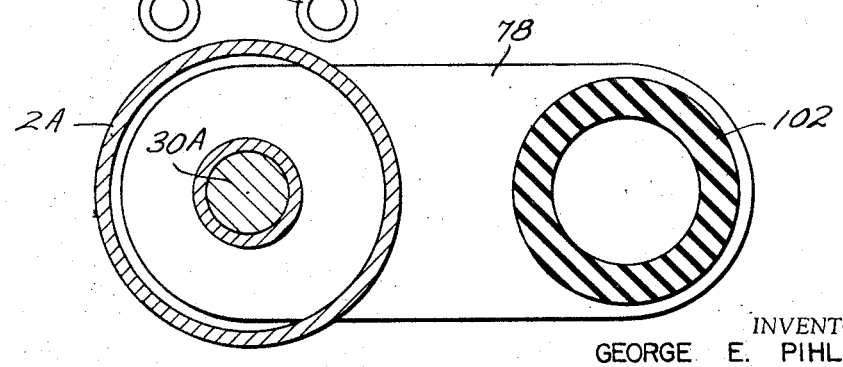
FIG. 4 is a cross-sectional view taken along line 4—4 of FIG. 3.

FIGS. 3 and 4 illustrate a modification of the invention featuring magnetic latching coupled with manual resetting. This form of the invention comprises a small panel 72 carrying two assemblies 74 and 76. The assembly 74 is essentially the same as the indicator described above and illustrated in FIG. 1 except that its core 30A has a soft-iron extension 78 attached to its bottom end. For convenience of illustration, details of the tabbing board 34A are not shown, but it is to be understood that it is essentially the same as tabbing board 34 shown in FIG. 1 and that it provides fixed connections between the terminal leads 36A and the ends (also not shown) of coil 28A.

The other assembly 76 consists of an aluminum case 80 having a hole 82 in the top end to accommodate a plastic push-button 84. The case is fitted with a cylindrical soft-iron sleeve 86. Sleeve 86 is cemented to the case. The bottom end of sleeve 86 has an internal flange 88 that is fitted with a sleeve bearing 90 of nonmagnetic material. The upper end of soft-iron sleeve 86 bears against a nonmagnetic washer 92 which loads an O-ring 94 that provides a seal for the push-button's shaft. The bottom or inner end of the push-button has an enlarged flange 96 that coacts with washer 92 to limit outward movement of the push-button. The push-button is spring loaded by means of a spiral compression spring 98, one end of which engages flange 88 of the soft-iron sleeve 86 and the other end of which engages flange 96 of the push-button. Cemented to the push-button and travelling with it is an elongate permanent magnet 100 that extends through and makes a sliding fit with bearing 90. Magnet 100 is polarized axially so that its south pole is at its bottom end and its north pole is at its top end. The extension 78 of core 30A projects out through a hole formed in the side of case 2A and terminates below case 80 of assembly 76. Case 80 is fastened to the core extension by means of a nonmagnetic washer 102 that is cemented in place. It is to be noted that normally magnet 100 does not project out of the soft-iron sleeve 86 and that a gap exists between it and core extension 78. It is to be noted also that magnet 100 can be moved into contact with the core extension by depressing push-button 84.

Operation of the device of FIGS. 3 and 4 will now be described. Assume that the indicator is in the condition shown in FIG. 3 with the white side of ball 46A exposed to window pane 8A. The reverse indication is achieved by pulsing coil 28A so that the magnetic field generated by its coil causes the upper end of core 30A to be a north pole. Immediately magnet 54A and in turn magnet 48A will rotate about 180°, so that the dark side of ball 46A is exposed to view. The ball remains latched in this position in the manner previously described until the indicator is reset. Resetting the indicator to its original white condition is achieved by depressing push-button 84. This causes magnet 100 to contact core extension 78, with the result that the magnet's field reverses the magnetic polarity in core 30A. This change in the polarity of core 30A in turn causes magnets 54A and 48A to rotate 180° to restore ball 46A to its original position.

It is to be noted that the soft-iron sleeve 86 completely shields magnet 100 in its normal at-rest position so that the presence of the magnet does not introduce any leakage flux problems affecting the indicator's sensitivity.

Both of the embodiments above described are useful in a wide variety of equipment and offer the advantages of high contrast indication, reliability, stability, positive magnetic latching in each indicating position, low input power requirements and rapid response. Moreover these indicators can be made in very small sizes and the parts thereof are easy to fabricate with conventional equipment.

A further advantage resides in the fact that their response and the strength of the magnetic latching can be modified by changing the strength and spacing of the various magnets. In this connection it is to be noted that the thickness of disc 12 may be modified to vary the gap between magnets 48 and 54 and the number of discs 20 may be increased or decreased to adjust the gap between magnet 54 and core 30. The indicators also are designed to facilitate assembly, with the various parts and subassemblies all being inserted through the bottom end of the case.

We claim:

1. Apparatus comprising a first spherical member with localized magnetic poles and a second round member with localized magnetic poles, said second round member shaped so as to have a different vibration characteristic than said first spherical member, first means defining a chamber in which said first spherical member is confined but is free to rotate to reverse the relative positions of its poles, second means defining a chamber in which said second member is confined but is free to turn to reverse the relative positions of its poles, said second means supporting said second member in close spaced relation to said first member so that said second member can magnetically latch said first member in a first orientation, and energizeable means operative when energized to magnetically influence said second member to turn so that its magnetic field will cause said first member to rotate to a second orientation in which it is again latched magnetically by said second member.

2. Apparatus as defined by claim 1 wherein said second member is an elongate cylindrical magnet that is polarized along its diameter.

3. Apparatus as defined by claim 2 wherein said cylindrical magnet is confined so that it cannot tumble end over end.

4. Apparatus as defined by claim 1 wherein said second member is disposed between said ball and said energizeable means.

5. Apparatus as defined by claim 2 further including mechanical means for imparting spin to said second member when it is magnetically influenced by operation of said energizeable means.

6. Apparatus as defined by claim 2 wherein said second means is provided with a projection disposed so as to deflect said second member in a direction to impart spin thereto when it is magnetically influenced by operation of said energizeable means.

7. Apparatus as defined by claim 1 wherein said first member comprises indicia on a portion thereof and further wherein said first means includes a window through which indicia may be viewed when said first member is in one of said predetermined orientations.

8. Apparatus as defined by claim 1 wherein said energizeable means comprises a magnetizeable core and a single energizeable coil surrounding said core.

9. Apparatus as defined by claim 8 wherein said core is made of hardened steel.

10. Apparatus as defined by claim 1 wherein said energizeable means comprises a magnetizeable core and two coils surrounding said core, and further including terminal means for energizing said coils separately so that one coil may be energized to magnetize said core with a first polarity and the other coil may be energized to magnetize said core with a second opposite polarity.

11. Apparatus as defined by claim 1 wherein said energizeable means comprises a coil and a magnetizeable core surrounded at least in part by said coil, and further including a magnetizeable extension on said core outside of said coil, a permanent magnet, means normally holding said permanent magnet away from said magnetizeable extension, and means for moving said permanent magnet toward said magnetizeable extension so as to induce in said core a magnetic field opposite to the field produced by energizing said coil, whereby said second member will turn back to its original position and thereby cause said first member to rotate back to said first orientation.

12. Apparatus as defined by claim 11 wherein said core is made of hardened steel and said extension is made of soft iron.

13. Apparatus as defined by claim 11 further including a first housing for (a) said first spherical member, (b) said second round member, (c) said coil and (d) said core, and a second housing for said permanent magnet.

14. Apparatus as defined in claim 11 further including means for shielding said permanent magnet from said core until said permanent magnet is moved toward said magnetizeable extension.

15. Apparatus as defined in claim 11 wherein said means for moving said permanent magnet is a button to which said permanent magnet is connected, and further wherein said means normally holding said additional magnet away from said magnetizeable member is a spring mounted in engagement with said button.

16. Apparatus as defined by claim 14 wherein said spring surrounds said permanent magnet.

References Cited

UNITED STATES PATENTS 3,109,168   10/1963   Abendroth _____ 340—373

JOHN W. CALDWELL, *Primary Examiner.*

H. PITTS, *Assistant Examiner.*

U.S. Cl. X.R.

340—366